May 12, 1925.

I. J. KELLY ET AL

INTERNAL COMBUSTION ENGINE

Filed Sept. 24, 1923

1,537,775

INVENTOR.
Isaac J. Kelly and
BY Horatio W. Smith
Munn & Co. ATTORNEYS.

Patented May 12, 1925.

1,537,775

UNITED STATES PATENT OFFICE.

ISAAC J. KELLY AND HORATIO W. SMITH, OF SAN JOSE, CALIFORNIA, ASSIGNORS TO AUTOMATIC BEARING MACHINE CO., OF SAN JOSE, CALIFORNIA.

INTERNAL-COMBUSTION ENGINE.

Application filed September 24, 1923. Serial No. 664,551.

*To all whom it may concern:*

Be it known that we, ISAAC J. KELLY and HORATIO W. SMITH, citizens of the United States, and residents of San Jose, county of Santa Clara, State of California, have invented a new and useful Internal-Combustion Engine, of which the following is a specification.

This invention relates to internal combustion engines and is particularly directed to a novel type of cylinder head which may be made to replace the head of cylinders of well known makes of automobile motors and which will be made to co-act with the piston of the cylinder to create turbulence in the gas on the compression stroke simultaneously with a formation of the spark and in such manner that the gas shall, in physical effect, be squeezed out from a constricted space between two parallel surfaces, i. e., the top of the piston and the top of the combustion chamber, substantially in horizontal alignment with the spark point. As stated, our invention is principally in the form of a head adapted to replace the usual head of the cylinder of a motor of well known make. In this connection, we are particularly interested in motors of the Ford type wherein the piston, on its compression stroke, moves above the parting line between the cylinder block and the combustion chamber. When our invention is incorporated in a motor of this variety, we have been able to increase the efficiency of the motor at least twenty per cent while decreasing the cost of operating the motor.

An essential object of the invention is to form or produce this turbulence as high in the combustion chamber as is practical in order to have the greatest amount of turbulence as near the spark as possible.

A still further object of the invention is to create this turbulence by squeezing the gases out from between the cylinder head and the piston over as much of the piston area as may be found practical, without decreasing to a serious extent the size of the throat through which gases pass from the combustion chamber to area of piston displacement.

A further object of the invention is to provide a compact combustion space in a motor of the L-head-type, which shall be more nearly spherical in shape than has heretofore been possible.

Our invention, therefore, comprises certain new features of construction and arrangement and combination of elements hereinafter set forth and pointed out in the claims annexed hereto.

Figure 1:
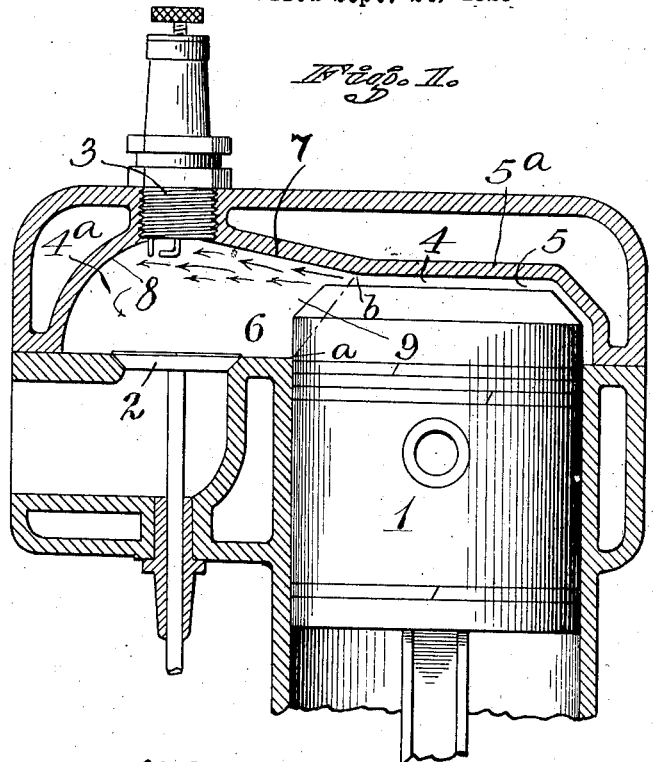
Figure 1 is a vertical section through a portion of an internal combustion engine showing our invention applied thereto.

In the drawings, (1) is the piston of an internal combustion engine; (2) are the valves of an L-head motor; (3) the spark plug; (4) the compact combustion space having a substantially spherical branch (4ª); and (5) what we term the clearance between the approximately parallel wall (5ª) of the cylinder head and the top of the piston (1). It shall be noted that the piston rises considerably above the line of parting (6) between the cylinder block and the cylinder head. The purpose of this construction will be referred to hereinafter.

On the compression stroke, the piston (1), in approaching the cylinder head at (5) closes off that section of the space in the cylinder head, forcing the gas into the compact or restricted space (4). As the piston approaches closely to the wall (5), there is a violent movement of the gas as caught in the space (4) toward the spark plug (3). The stream of gas moves violently by the spark points at the time of the spark and, in a short space of time, spreads the spark-generated-flame in a spiral manner. Although more than one half of the top of the piston is covered by the closely approaching wall (5ª) of the cylinder head, yet, and because of the fact that the piston raises above the parting line (6), the area or throat through which the gases must pass on the downward stroke of the piston is not greatly restricted.

In addition to the functions herein set forth for creating a violent turbulence in the combustion space simultaneously with the formation of the spark, it will be seen that the swift stream of gas along the top wall of the combustion chamber keeps that surface practically free from carbon deposits as well as cleaning the spark plug and top of the piston. This violent stream of gas scavenges the combustion space on the exhaust stroke.

We find that by producing great turbulence of gas in the combustion space and in the manner aforesaid and at the time of the spark, we are able to assist the rapid spread of the flame before any of the gas in this area has had time to burn sufficiently to raise the temperature and pressure in the rest of the charge to the point of detonation, thereby allowing the use of a higher ratio of compression without a possibility of the motor tending to knock.

Also in this manner of raising the compression ratio, which is made possible by the effective shape of the combustion chamber, we are able to produce a more powerful motor than has been heretofore practical for a certain base and stroke.

It shall be noted that the parallel wall (5ª) extends across the piston chamber for a distance approximately equal to two thirds or more of the top face of the piston and that this wall then merges into a straight angularly disposed surface (7) which, in turn, merges into the curved surface (8). We are thereby able to satisfactorily set up this violent disturbance of the gases without in any way choking the effective throat (9) through which the gases pass on the downward stroke of the piston. We are also able to dispose the spark point (3) in substantially horizontal alignment with the aforesaid compact-combustion-space so that the maximum turbulence is created immediately at said spark point.

In Figure 1 it is observed that the depth of the compact combustion space (4) is properly proportioned in calculation to the throw of the piston or movement thereof into the combustion so that the space (4) is constructed to a point of maximum efficiency on the full compression stroke, and that at that time, said space is approximately on a horizontal line with the spark point. In this manner the gas spreads rapidly across said point to clean same and it is then caught by the curved wall (8) to spread the spark-generated-frame in a spiral manner.

Figure 2:
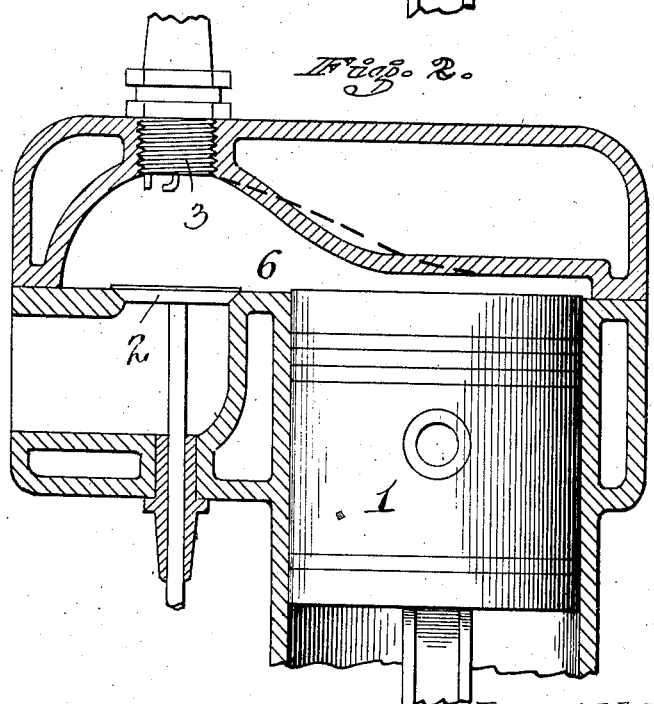
Figure 2 is a similar view showing a slightly modified form of our invention.

In Figure 2 we omit the inclined wall (7) and bring the wall (5ª) into direct horizontal alignment with the spark point (3). In Figure 1, the manner of creating the horizontal disposition of the parts is, so to speak, indirectly by way of said wall (7).

We claim:

1. A combustion motor comprising a cylinder; a reciprocating piston in said cylinder; a cylinder head; a recessed surface substantialy parallel to the end of said piston formed in said cylinder head and spaced sufficiently from the end of said piston at the end of a compression stroke thereof to form a compact combustion space between said surface and said piston; an enlarged combustion space formed in said cylinder head communciating with said compact combustion space; and a pair of spark points in said enlarged space; said compact and said enlarged combustion spaces being so proportioned and formed that a violent agitation of gases is set up in said enlarged section by a compression stroke of said piston without substantially choking the flow of gases between said cylinder and said spaces.

2. The combination as set forth in claim 1 in which said spark points are positioned substantially in the plane of said parallel surface in a manner to cause instantaneous ignition of the gases in said compact combustion space.

3. A combustion motor comprising a cylinder; a reciprocating piston in said cylinder; a cylinder head; a recessed surface formed in said cylinder head and spaced sufficiently from the end of said piston at the end of a compression stroke thereof to form a compact combustion space between said surface and said piston; an enlarged combustion space formed in said cylinder head communicating with said compact combustion space; and a pair of spark points in said enlarged space; said compact and said enlarged combustion spaces being so proportioned and formed that a violent agitation of gases is set up in said enlarged section by a compression stroke of said piston without substantially choking the flow of gases between said cylinder and said spaces.

4. The combination as set forth in claim 3 in which said piston moves substantially beyond the end of said cylinder into said head space at the end of the compression stroke thereof.

ISAAC J. KELLY.
HORATIO W. SMITH.